UNITED STATES PATENT OFFICE.

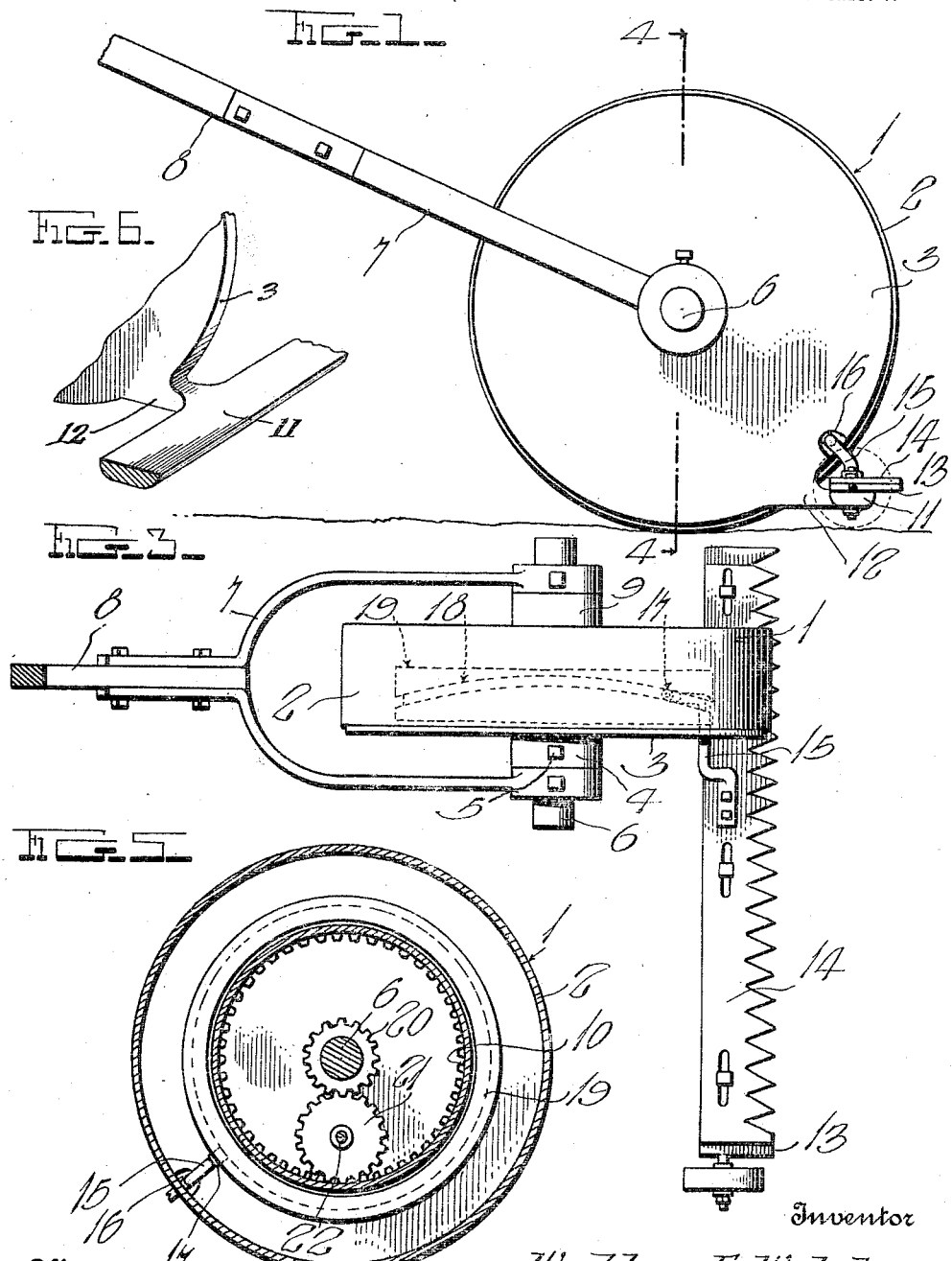

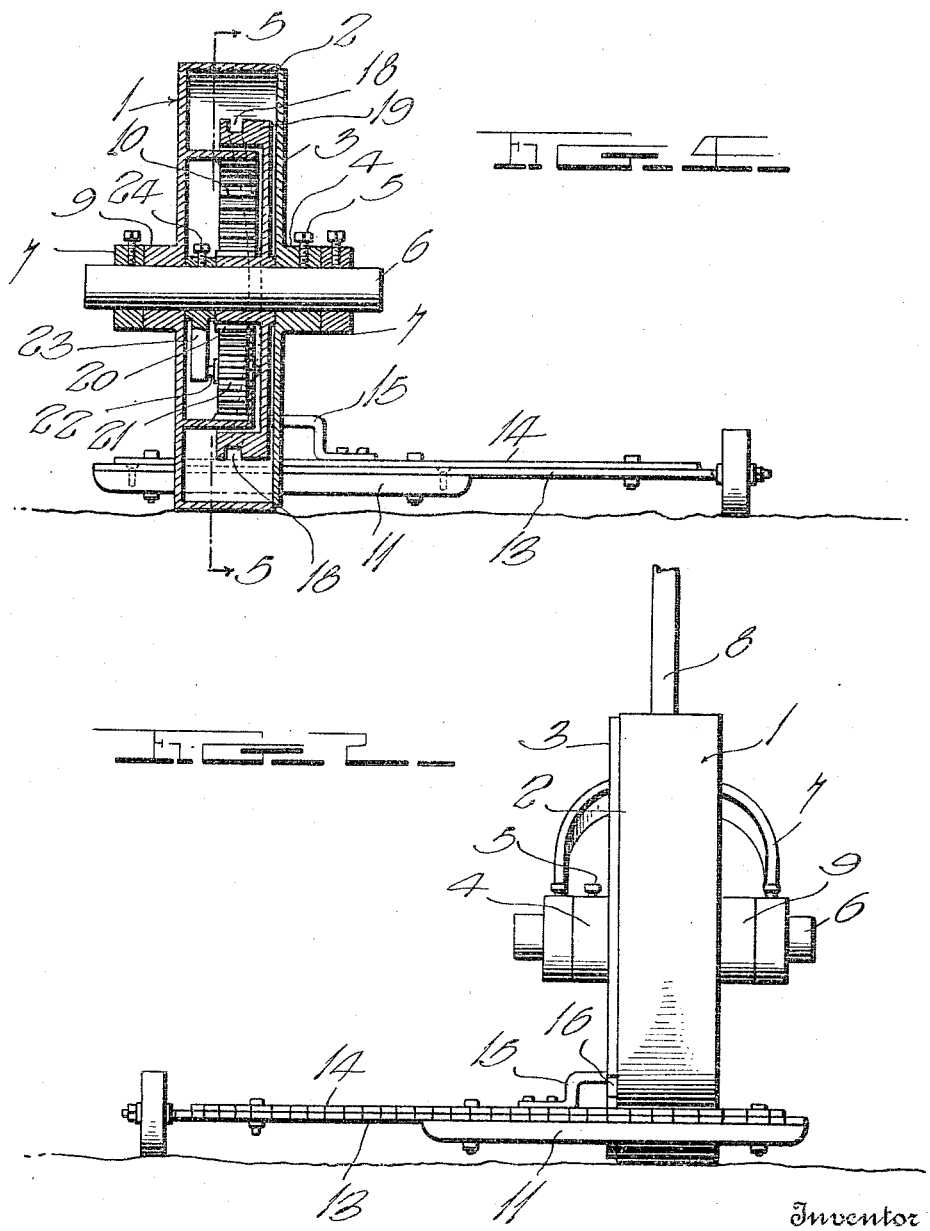

WALTER F. WELCH, OF JAMAICA, NEW YORK.

MOWING-MACHINE.

1,279,052. Specification of Letters Patent. Patented Sept. 17, 1918.

Application filed July 23, 1917. Serial No. 182,333.

*To all whom it may concern:*

Be it known that I, WALTER F. WELCH, a citizen of the United States, residing at Jamaica, in the county of Queens and State of New York, have invented certain new and useful Improvements in Mowing-Machines; and I do declare the following to be a full, clear, and exact description of the invention, such as will enable others skilled in the art to which it appertains to make and use the same.

My invention relates to improvements in mowing machines which may be of either of the horse drawn or hand operated type, the present embodiment, however, being of the latter construction.

The principal object of the invention is to provide a mowing machine which will be simple and inexpensive to manufacture and market, yet one which will be highly efficient and durable, novel means being provided whereby a reciprocating sickle bar may be rapidly actuated with the expenditure of little power.

With the foregoing general object in view, the invention resides in the novel features of construction and unique combination of parts to be hereinafter fully described and claimed, the descriptive matter being supplemented by the accompanying drawings which form a part of this specification and in which:

Figure 1 is a side elevation of the improved machine;

Fig. 2 is a front elevation thereof;

Fig. 3 is a top plan view;

Fig. 4 is a vertical transverse section on the plane of the line 4—4 of Fig. 1; and Fig. 5 is an additional vertical section on the plane designated by the line 5—5 of Fig. 4, showing more particularly the driving means for the reciprocating sickle bar.

Fig. 6 is a detail perspective view showing more particularly the mounting of the supporting ledge for the sickle bars.

In the drawings above briefly described, the numeral 1 designates an earth engaging wheel having a laterally extending annular flange 2 at its periphery which coacts with the body of said wheel and a circular end plate 3, in forming a housing for the driving mechanism of the sickle bar, said plate 3 having a hub 4 secured by means of a set screw or the like 5 to a short horizontal shaft or axle 6, the forked front end 7 of the mower handle 8, being rigidly secured to the ends of said shaft or axle whereby it is held against rotation. The wheel is equipped with a hub 9 which is rotatable on the shaft or axle 6, and as shown clearly in the drawings, the body of said wheel is provided with an internal gear 10 which is spaced inwardly from the flange 2, but positioned concentric therewith.

Formed integrally with the edge of the end plate 3, and positioned adjacent the front side of the machine, is a transverse horizontal ledge 11, said ledge being preferably spaced a slight distance in advance of the end plate 3, by means of a suitable web or the like 12. A fixed sickle bar 13 is carried by the ledge 11 and projects laterally from the wheel as shown clearly, said fixed sickle bar coacting with a movable sickle bar 14 which contacts slidably with its upper side.

An arm 15 is rigidly secured to the upper side of the movable sickle bar 14 and extends through a notch 16 in the front edge of the plate 3, into the interior of the housing formed by said plate and the wheel, the inner end of said arm being provided with an upstanding roller or other suitable shoe 17 which is received in a serpentine cam groove 18 which is formed in the periphery of cam wheel 19, the latter being rotatably mounted on the shaft 6 between the body of the wheel 1 and the end plate 3 and having a central spur gear 20 which meshes with an idler 21 driven from the internal gear 10 above described. Idler 21 is rotatably mounted on a short stub shaft 22 which extends laterally from the lower end of a rigid arm 23, the latter being secured by means of a set screw or the like 24, to the shaft 6, between the gear 20 and the hub 9.

By the driving connections just described, rotation of the wheel 1, as the machine is pushed or pulled forwardly, as the case may be, will rotate the idler 21 so that the latter in turn imparts rotary movement to the cam wheel 19, through the instrumentality of its gear 20. As wheel 19 rotates the cam groove 18 thereof will reciprocate the arm 15 and will consequently move the sickle bar 14 in a corresponding manner. The two sickle bars 13 and 14 coact in the usual manner and due to the rapid movement imparted to the bar 14 this coaction will be extremely effective. Furthermore, this rapid reciprocation of the sickle bar 14, insures that the machine shall be easy to operate with little or no vibration.

By constructing the improved mower in the manner shown and described, it will be inexpensive to manufacture and may therefore be marketed at a minimum cost, yet the device will be highly efficient and durable. On account of the several advantages flowing from the construction in question, such construction constitutes the preferred form of the machine. I wish it understood, however, that within the scope of the invention as claimed, numerous minor changes may be made.

I claim:

1. A mowing machine comprising a fixed horizontal axle, a wheel rotatably mounted on said axle and having a laterally extending annular flange, an end plate secured on said axle and coacting with said flange and wheel in forming a housing, said end plate having an opening near its edge, a horizontal ledge formed integrally with the front edge of said end plate, adjacent said opening and extending transversely in front of said wheel, a fixed sickle bar carried by said ledge, a movable sickle bar coacting with said fixed bar, an operating device for said movable sickle bar extending into said housing through said opening, and means in said housing and driven by said wheel for reciprocating said operating device.

2. A mowing machine comprising a fixed horizontal axle, a driving wheel mounted rotatably on said axle and having a laterally extending annular flange to travel on the ground, a flat circular end plate secured to the axle and having its periphery located at the edge of said flange to form with the latter a flat vertical housing, a cam wheel in said housing consisting of a hub rotatable on said axle, an annular web extending from said hub adjacent said end plate, and an annular flange on said web extending toward said driving wheel, said last named flange having a continuous cam, and an additional annular flange on said driving wheel extending into the space surrounded by the flange of said cam wheel; together with grass cutting means, means for driving said cutting means from said cam, and gearing for driving said hub from said additional flange.

In testimony whereof I have hereunto set my hand in the presence of two subscribing witnesses.

WALTER F. WELCH.

Witnesses:
S. F. WELCH,
WM. B. GROAT, Jr.

Copies of this patent may be obtained for five cents each, by addressing the "Commissioner of Patents, Washington, D. C."